(12) United States Patent
Michaloski et al.

(10) Patent No.: US 8,755,122 B2
(45) Date of Patent: Jun. 17, 2014

(54) LASER PULSE STRETCHING UNIT AND METHOD FOR USING SAME

(75) Inventors: Paul Francis Michaloski, Rochester, NY (US); Mark C Sanson, Macedon, NY (US); Daniel Max Staloff, Rochester, NY (US); Clair Theodore Tienvieri, Rochester, NY (US)

(73) Assignee: Corning Incorporated, Corning, NY (US)

( * ) Notice: Subject to any disclaimer, the term of this patent is extended or adjusted under 35 U.S.C. 154(b) by 255 days.

(21) Appl. No.: 13/316,971

(22) Filed: Dec. 12, 2011

(65) Prior Publication Data

US 2013/0148207 A1 Jun. 13, 2013

(51) Int. Cl.
G02B 27/14 (2006.01)

(52) U.S. Cl.
CPC .................................. *G02B 27/145* (2013.01)
USPC .......................................... 359/629; 359/636

(58) Field of Classification Search
USPC .................. 359/238, 618, 629, 636, 731, 857
See application file for complete search history.

(56) References Cited

U.S. PATENT DOCUMENTS

| | | | |
|---|---|---|---|
| 6,191,887 B1 | 2/2001 | Michaloski et al. | |
| 6,389,045 B1 | 5/2002 | Mann et al. | |
| 6,535,531 B1 | 3/2003 | Smith et al. | |
| 6,928,093 B2 | 8/2005 | Webb et al. | |
| 7,369,597 B2 | 5/2008 | Smith et al. | |
| 7,403,550 B1 | 7/2008 | Spinelli et al. | |
| 7,620,080 B2 | 11/2009 | Cobb et al. | |
| 7,813,406 B1 | 10/2010 | Nguyen et al. | |
| 2005/0105579 A1 | 5/2005 | Smith et al. | |
| 2008/0179548 A1 | 7/2008 | Bykanov et al. | |
| 2008/0266663 A1 | 10/2008 | Cook et al. | |
| 2009/0080478 A1 | 3/2009 | Burkert et al. | |
| 2009/0154642 A1 | 6/2009 | Bykanov et al. | |
| 2010/0127186 A1 | 5/2010 | Bykanov et al. | |
| 2011/0216421 A1* | 9/2011 | Shirasaki ...................... 359/629 |
| 2011/0284767 A1* | 11/2011 | Wolleschensky et al. . 250/459.1 |

FOREIGN PATENT DOCUMENTS

DE 102006047257 4/2008

OTHER PUBLICATIONS

PCT/US2012/068691 Search Report.
Burkett et al; "Pulse Stretcher With Variable Pulse Length for Excimer Laser Applications"; Review of Scientific Instruments, 81, 033104 (2010).
Khare et al; "Temporal Stretching of Laser Pulses"; Coherence and Ultrashort Pulse Laser Emissions, pp. 205-226.
Kojima et al; "Laser Pulse-Strecthing With Multiple Optical Ring Cavities" ; Applied Optics; vol. 41, No. 30; October 20, 2002; pp. 6360-6370.

* cited by examiner

*Primary Examiner* — Mahidere Sahle
(74) *Attorney, Agent, or Firm* — Kevin L. Bray; Timothy M Schaeberle (57) ABSTRACT

A laser pulse stretching unit is described herein which has one or more nested optical delay paths. In addition, a method for using the laser pulse stretching unit is also described herein.

29 Claims, 7 Drawing Sheets

LASER PULSE STRETCHING UNIT AND METHOD FOR USING SAME

TECHNICAL FIELD

The present invention relates to a laser pulse stretching unit which has one or more nested optical delay paths. The present invention also relates to a method for using the laser pulse stretching unit.

BACKGROUND

Many lasers operate predominately or only as pulsed sources and the pulse duration is determined by the duration of effective pumping, intra-resonator energy extraction rates, etc. However, in certain applications where pulsed lasers are utilized it is necessary to extend the duration of the pulsed laser beam without reducing the pulse energy. The duration of the pulsed laser beam can be increased by using a laser pulse stretcher which stretches the laser pulses temporally. The stretching or lengthening of the temporal pulse width of the laser beam has many applications in the area of laser energy management. For example, one benefit of the increase in pulse length is a decrease in the peak power of a pulsed laser beam which can effectively reduce the laser induced material damage on optical components. A new laser pulse stretching unit and method for using the same are the subject of the present invention.

SUMMARY

A laser light pulse stretching unit and a method for using the laser light pulse stretching unit are described in the independent claims of the present application. Advantageous embodiments of the laser light pulse stretching unit and the method for using the laser light pulse stretching unit are described in the dependent claims.

In one aspect, the present invention provides a laser light pulse stretching unit comprising: (a) a first pair of reflective optical surfaces including a first reflective surface and a second reflective surface that share a common focus; (b) a second pair of reflective optical surfaces including a third reflective surface and a fourth reflective surface that share the common focus; (c) the first pair of reflective optical surfaces are nested within the second pair of reflective optical surfaces whereby the first reflective surface and the second reflective surface are disposed between the third reflective surface and the fourth reflective surface; (d) the first pair of reflective optical surfaces create a first delayed path; (e) the second pair of reflective optical surfaces create a second delayed path wherein the first pair of reflective optical surfaces are configured to allow the second delayed path to pass there through; (f) a first beam splitter disposed between the first reflective surface and the second reflective surface and between the third reflective surface and the fourth reflective surface; and (g) a second beam splitter disposed between the first reflective surface and the second reflective surface and between the third reflective surface and the fourth reflective surface.

In another aspect, the present invention provides a method for using a light pulse stretching unit comprising the step of: (a) receiving an incident light beam at the laser light pulse stretching unit which comprises: (i) a first pair of reflective optical surfaces including a first reflective surface and a second reflective surface that share a common focus; (ii) a second pair of reflective optical surfaces including a third reflective surface and a fourth reflective surface that share the common focus; (iii) the first pair of reflective optical surfaces are nested within the second pair of reflective optical surfaces whereby the first reflective surface and the second reflective surface are disposed between the third reflective surface and the fourth reflective surface; (iv) a first beam splitter disposed between the first reflective surface and the second reflective surface and between the third reflective surface and the fourth reflective surface; (v) the first beam splitter configured to receive the incident light beam and pass a portion of the incident light beam along an output path and to redirect a remaining portion of the incident light beam onto a first delayed path created by the first pair of reflective optical surfaces and then receive the remaining portion of the incident light beam that traversed the first delayed path and redirect a portion of the incident light beam that traversed the first delayed path onto the output path and pass a remaining portion of the incident light beam that traversed the first delayed path back onto the first delayed path; (vi) a second beam splitter disposed between the first reflective surface and the second reflective surface and between the third reflective surface and the fourth reflective surface; (vii) the second beam splitter configured to receive the portion of the incident light beam that traversed the output path but not the first delayed path and pass a portion of the incident light beam that traversed the output path and not the first delayed path onto the output path and to redirect a remaining portion of the incident light beam that had traversed the output path and not the first delayed path onto a second delayed path created by the second pair of reflective optical surfaces where the first reflective surface and the second reflective surface are configured not to block the second delayed path and then redirect a portion of the incident light beam that traversed the second delayed path onto the output path and pass a remaining portion of the incident light beam that traversed the second delayed path back onto the second delayed path; and (viii) the second beam splitter configured to receive the portion of the incident light beam that traversed the output path and the first delayed path and pass a portion of the incident light beam that traversed the output path and the first delayed path onto the output path and to redirect a remaining portion of the incident light beam that had traversed the output path and the first delayed path onto the second delayed path and then redirect a portion of the incident light beam that traversed the second delayed path onto the output path and pass a remaining portion of the incident light beam that traversed the second delayed path back onto the second delayed path.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1A:
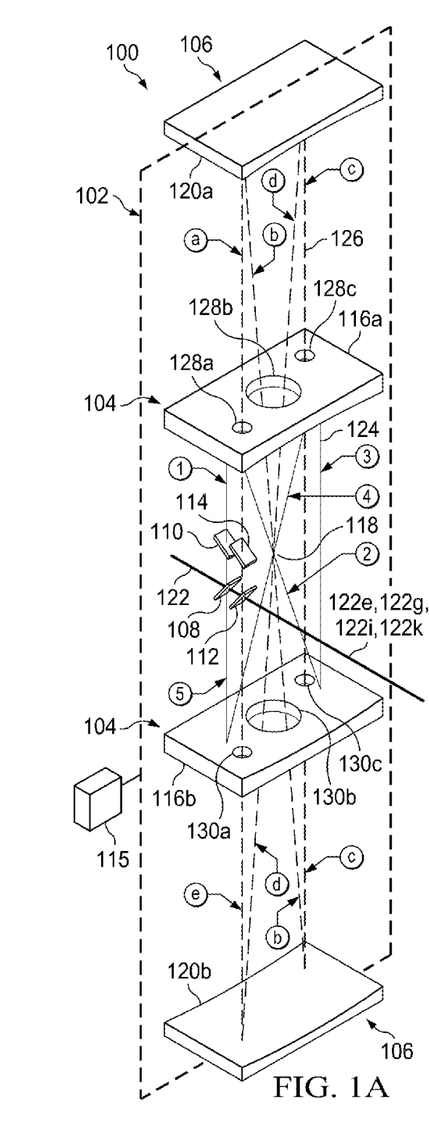
FIGS. 1A-1D are several diagrams illustrating an exemplary laser pulse stretching unit configured in accordance with an embodiment of the present invention.
Figure 1B:
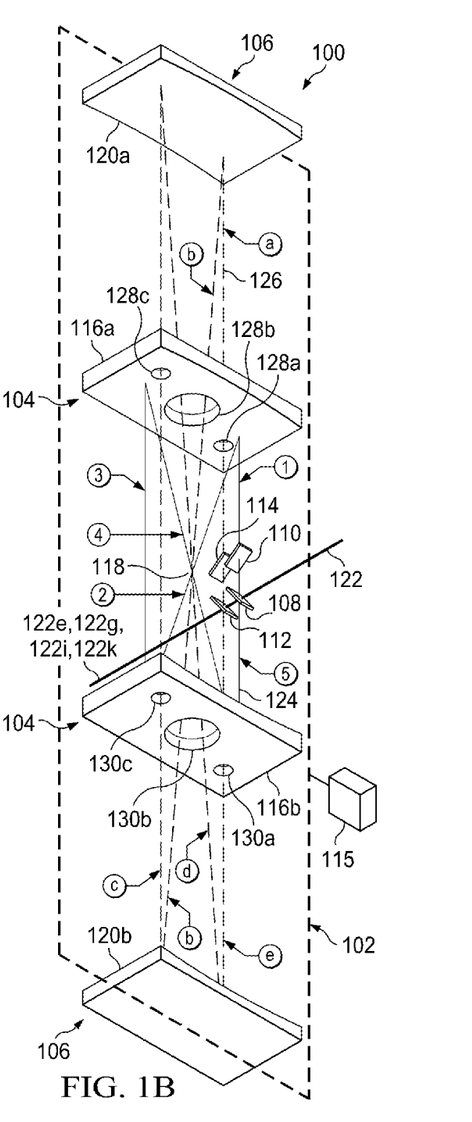

Referring to FIGS. 1A-1D, there are several diagrams of an exemplary laser pulse stretching unit 100 configured in accordance with an embodiment of the present invention. As shown in FIGS. 1A and 1B, the exemplary laser pulse stretching unit 100 includes a mechanical package 102, a first pair of reflective optical surfaces 104, a second pair of reflective optical surfaces 106, a first beam splitter 108, a first compensator plate 110, a second beam splitter 112, a second compensator plate 114, and a beam splitter selector unit 115. The mechanical package 102 houses at least the first pair of reflective optical surfaces 104, the second pair of reflective optical surfaces 106, the first beam splitter 108, the first compensator plate 110, the second beam splitter 112, and the second compensator plate 114. The mechanical package 102 also includes mechanical components used to support the various components 104, 106, 108, 110, 112 and 114 but for clarity those mechanical components have not been shown or described herein.

The first pair of reflective optical surfaces 104 includes a first reflective surface 116a and a second reflective surface 116b. The first reflective surface 116a and the second reflective surface 116b are opposed to one another or generally facing one another and have a confocal arrangement to one another such that they share a common focus 118. The second pair of reflective optical surfaces 106 includes a third reflective surface 120a and a fourth reflective surface 120b. The third reflective surface 120a and the second reflective surface 120b are opposed to one another or generally facing one another and have a confocal arrangement to one another such that they share the common focus 118. The first, second, third and fourth reflective surfaces 116a, 116b, 120a and 120b can have various types of surfaces and features which are described in detail below after a discussion about how the components 104, 106, 108, 110, 112, 114, 116a, 116b, 120a and 120b can be arranged to extend the duration of a pulsed laser beam 122 (incident light beam 122) without reducing the pulse energy of the laser beam 122.

The first pair of reflective optical surfaces 104 are nested within the second pair of reflective optical surfaces 106 such that the first reflective surface 116a and the second reflective surface 116b are disposed between the third reflective surface 120a and the fourth reflective surface 120b. The first pair of reflective optical surfaces 104 create a first delayed path 124 (discussed below). The second pair of reflective optical surfaces 106 create a second delayed path 126 (discussed below) where the first delayed path 124 is shorter than the second delayed path 126. Moreover, the first pair of reflective optical surfaces 104 are configured to allow the second delayed path 126 to pass there through. In particular, the first reflective surface 116a includes one or more clear apertures 128 (or holes 128) therein which allow the second delayed path 126 to pass there through. In addition, the second reflective surface 116b includes one or more clear apertures 130 (or holes 130) therein which allow the second delayed path 126 to pass there through. In this example, the first reflective surface 116a includes three holes 128a, 128b and 128c formed therein which allow the second delayed path 126 to pass there through. The second reflective surface 116b includes three holes 130a, 130b and 130c formed therein which allow the second delayed path 126 to pass there through.

The first beam splitter 108 is disposed between the first reflective surface 116a and the second reflective surface 116b and between the third reflective surface 120a and the fourth reflective surface 120b. The first compensator plate 110 (e.g., first offset plate 110) is disposed between the first beam splitter 108 and the first reflective surface 116a. The second beam splitter 112 is disposed between the first reflective surface 116a and the second reflective surface 116b and between the third reflective surface 120a and the fourth reflective surface 120b. The second compensator plate 114 (e.g., second offset plate 114) is disposed between the second beam splitter 112 and the third reflective surface 120a. The first beam splitter 108 and the second beam splitter 112 are configured to reflect a certain percentage of a light beam and transmit the remaining percentage of the light beam. Preferably, the first beam splitter 108 and the second beam splitter 112 have a reflectance plus transmittance which equal one. If desired, the first beam splitter 108 and/or the second beam splitter 112 can have variable beam splitter coatings or discrete beam splitter coatings. In this case, the reflectivity of the first beam splitter 108 and/or the second beam splitter 112 can be changed by controlling which specific coating is in the path of the incident beam. This is one way that can be used to adjust the temporal profile of the final pulse. A more detailed discussion about these types of beam splitters is described in a co-filed U.S. patent application Ser. No. 13/316,884 entitled "Variable Pulse Stretching Length by Variable Beamsplitter Reflectivity". The contents of this document are incorporated by reference herein.

As shown in FIGS. 1A-1D, the first beam splitter 108 is configured to receive an incident light beam 122 and pass a portion of the incident light beam 122a onto an output path 130a and to redirect a remaining portion of the incident light beam 122b through the first compensator plate 110 onto the first delayed path 124 created by the first pair of reflective optical surfaces 104. The first beam splitter 108 is also configured to receive the remaining portion of the incident light beam 122b that traversed the first delayed path 124 and redirect a portion of the incident light beam 122c that traversed the first delayed path 124 onto the output path 130a and pass a remaining portion of the incident light beam 122d that traversed the first delayed path 124 back onto the first delayed path 124. Basically, a remaining portion of the incident light beam 122 will traverse the first delayed path 124 multiple times where each time less energy from the incident light beam 122 is redirected to the output path 130a and passed back onto the first delayed path 124.

Figure 1C:
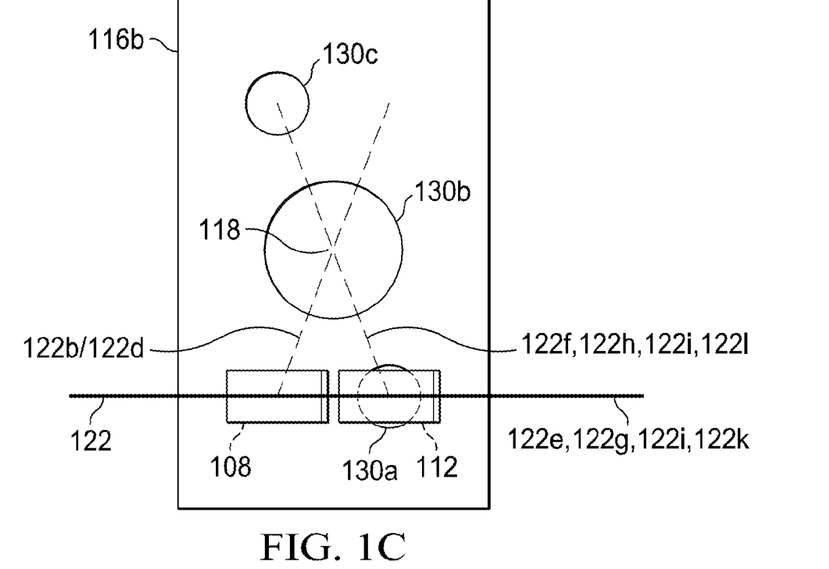
Figure 1D:
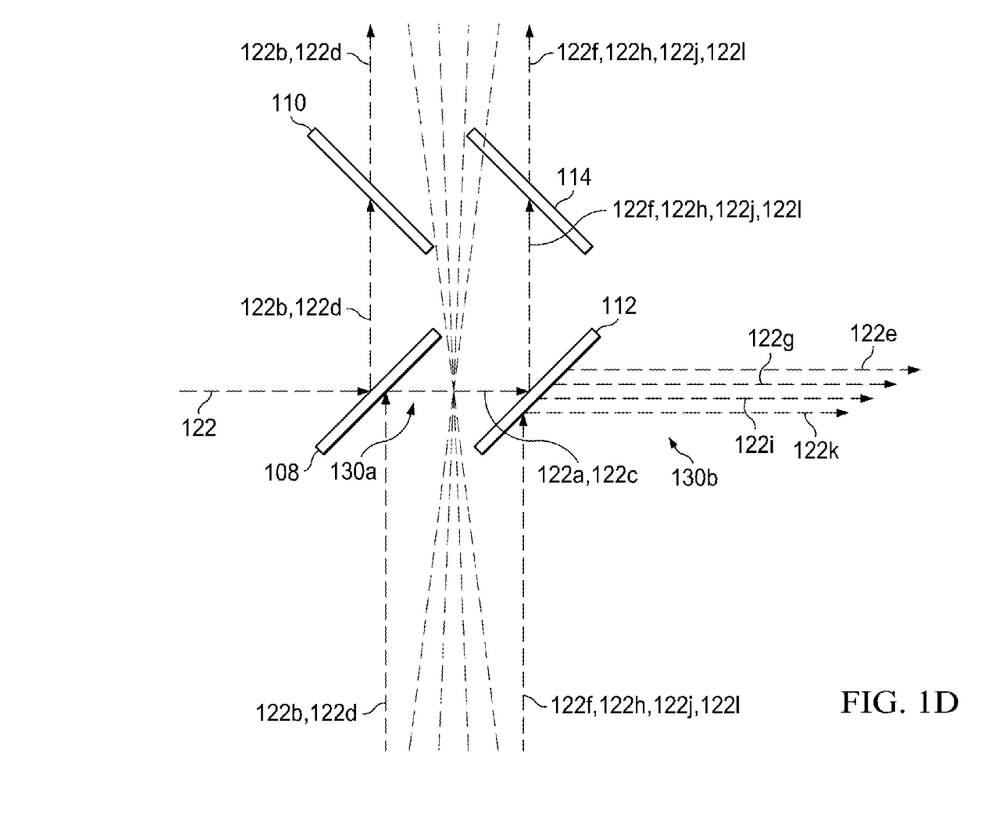

The first delayed path 124 starts from the first beam splitter 108 where the remaining portion of the incident light beam 122b travels through the first compensator plate 110 to the first reflective surface 116a (see label "1"). The first reflective surface 116a reflects the remaining portion of the incident light beam 122b through the common focus 118 to the second reflective surface 116b (see label "2"). The second reflective surface 116b reflects the remaining portion of the incident light beam 122b to the first reflective surface 116a (see label "3"). The first reflective surface 116a reflects the remaining portion of the incident light beam 122b through the common focus 118 to the second reflective surface 116b (see label "4"). The second reflective surface 116b reflects the remaining portion of the incident light beam 122b back to the first beam splitter 108 (see label "5").

The second beam splitter 112 is configured to receive the portion of the incident light beam 122a that traversed the output path 130a but not the first delayed path 124 and pass a portion of the incident light beam 122e that traversed the output path 130a and not the first delayed path 124 onto the output path 130b and to redirect a remaining portion of the incident light beam 122f that had traversed the output path 130a and not the first delayed path 124 through the second compensator plate 114 onto the second delayed path 126. The second beam splitter 112 is also configured to receive the remaining portion of the incident light beam 122f that traversed the second delayed path 126 and redirect a portion of the incident light beam 122g that traversed the second delayed path 126 onto the output path 130b and pass a remaining portion of the incident light beam 122h that traversed the second delayed 126 path back onto the second delayed path 126.

Furthermore, the second beam splitter 112 is configured to receive the portion of the incident light beam 122c that traversed the output path 130a and the first delayed path 124. The second beam splitter 112 is also configured to pass a portion of the incident light beam 122i that traversed the output path 130a and the first delayed path 124 onto the output path 130b and to redirect a remaining portion of the incident light beam 122j that had traversed the output path 130a and the first delayed path 124 onto the second delayed path 126. In addition, the second beam splitter 112 is configured to receive the remaining portion of the incident light 122j bean that traversed the second delayed path 126 and redirect a portion of the incident light beam 122k that traversed the second delayed path 126 onto the output path 130b and pass a remaining portion of the incident light beam 122l that traversed the second delayed path 126 back onto the second delayed path 126. Basically, a remaining portion of the incident light beam 122 will traverse the second delayed path 126 multiple times where each time less energy from the incident light beam 122 is redirected to the output path 130b and passed back onto the second delayed path 126. FIG. 1C is a top view diagram illustrating the first and second beam splitters 108 and 112 positioned over the second reflective surface 116b including holes 130a, 130b and 130c.

The second delayed path 122 starts from the second beam splitter 112 where the remaining portion of the incident light beam 122f (for example) directed thereon travels through the second compensator plate 114 and the hole 128a in the first reflective surface 116a to the third reflective surface 120a (see label "a"). The third reflective surface 120a reflects the remaining portion of the incident light beam 122f through another hole 128b in the first reflective surface 116a, the common focus 118 and hole 130b in the second reflective surface 116b to the fourth reflective surface 120b (see label "b"). The fourth reflective surface 120b reflects the remaining portion of the incident light beam 122f through hole 130c in the second reflective surface 116b and hole 128c in the first reflective surface 116a to the third reflective surface 120a (see label "c"). The third reflective surface 120a reflects the remaining portion of the incident light beam 122f through the hole 128b in the first reflective surface 116a, the common focus 118 and hole 130b in the second reflective surface 116b to the fourth reflective surface 120b (see label "d"). The fourth reflective surface 120b reflects the remaining portion of the incident light beam 122f through hole 130a in the second reflective surface 116b back to the second beam splitter 110 (see label "e"). As can be seen, the second delayed path 126 is longer than the first delayed path 124.

The beam splitter selector unit 115 can be used so the user can activate and deactivate anyone or any combination of the first beam splitter 108 and the second beam splitter 112 to select which delayed paths 124 and/or 126 is/are traversed or which combinations of delayed paths 124 and 126 are traversed to tailor the output pulse's temporal profile. For instance, the beam splitter selector unit 115 can be used to activate the first beam splitter 108 and deactivate the second beam splitter 112 such that only the first delayed path 124 is traversed. Or, the beam splitter selector unit 115 can be used to deactivate the first beam splitter 108 and activate the second beam splitter 112 such that only the second delayed path 124 is traversed. Alternatively, the beam splitter selector unit 115 can be used to activate the first beam splitter 108 and activate the second beam splitter 112 such that both the first delayed path 124 and second delayed path 126 are traversed.

Figure 2A:
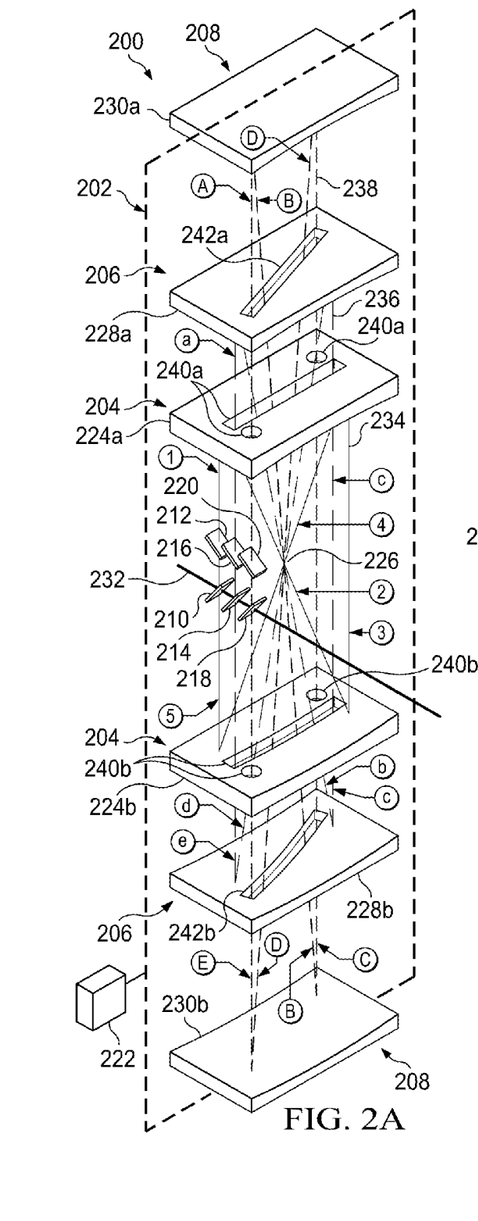
FIGS. 2A-2D are several diagrams illustrating an exemplary laser pulse stretching unit configured in accordance with another embodiment of the present invention.
Figure 2B:
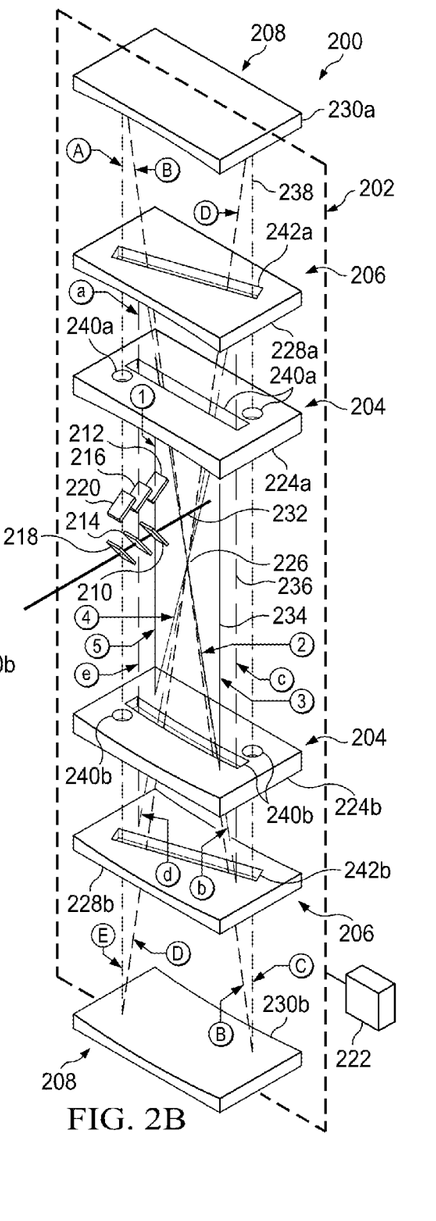

Referring to FIGS. 2A-2D, there are several diagrams illustrating an exemplary laser pulse stretching unit 200 configured in accordance with an embodiment of the present invention. As shown in FIGS. 2A and 2B, the exemplary laser pulse stretching unit 200 includes a mechanical package 202, a first pair of reflective optical surfaces 204, a second pair of reflective optical surfaces 206, a third pair of reflective optical surfaces 208, a first beam splitter 210, a first compensator plate 212, a second beam splitter 214, a second compensator plate 216, a third beam splitter 218, a third compensator plate 220, and a beam splitter selector unit 222. The mechanical package 202 houses at least the first pair of reflective optical surfaces 204, the second pair of reflective optical surfaces 206, the third pair of reflective surfaces 208, the first beam splitter 210, the first compensator plate 212, the second beam splitter 214, the second compensator plate 216, the third beam splitter 218, and the third compensator plate 220. The mechanical package 202 also includes mechanical components used to support the various components 204, 206, 208, 210, 212, 214, 216, 218 and 220 but for clarity those mechanical components have not been shown or described herein.

The first pair of reflective optical surfaces 204 includes a first reflective surface 224a and a second reflective surface 224b. The first reflective surface 224a and the second reflective surface 224b are opposed to one another or generally facing one another and have a confocal arrangement to one another such that they share a common focus 226. The second pair of reflective optical surfaces 206 includes a third reflective surface 228a and a fourth reflective surface 228b. The third reflective surface 228a and the second reflective surface 228b are opposed to one another or generally facing one another and have a confocal arrangement to one another such that they share the common focus 226. The third pair of reflective optical surfaces 208 includes a fifth reflective surface 230a and a sixth reflective surface 230b. The fifth reflective surface 230a and the sixth reflective surface 230b are opposed to one another or generally facing one another and have a confocal arrangement to one another such that they share the common focus 226. The first, second, third, fourth, fifth and sixth reflective surfaces 224a, 224b, 228a, 228b, 230a and 230b can have various types of surfaces and features which are described in detail below after a discussion about how the components 204, 206, 208, 210, 212, 214, 216, 218, 220, 224a, 224b, 228a, 228b, 230a and 230b are arranged to extend the duration of a pulsed laser beam 232 (incident light beam 232) without reducing the pulse energy of the laser beam 232.

The first pair of reflective optical surfaces 204 are nested within the second pair of reflective optical surfaces 206 while the second pair of reflective optical surfaces 206 are nested within the third pair of reflective optical surfaces 208. In particular, the first reflective surface 224a and the second reflective surface 224b are disposed between the third reflective surface 228a and the fourth reflective surface 228b while the third reflective surface 228a and the fourth reflective surface 228b are disposed between the fifth reflective surface 230a and the sixth reflective surface 230b. The first pair of reflective optical surfaces 204 create a first delayed path 234 (discussed below). The second pair of reflective optical surfaces 206 create a second delayed path 236 (discussed below) where the first delayed path 234 is shorter than the second delayed path 236. The third pair of reflective optical surfaces 208 create a third delayed path 238 (discussed below) where the second delayed path 236 is shorter than the third delayed path 238.

Moreover, the first pair of reflective optical surfaces 204 are configured to allow the second delayed path 236 and the third delayed path 238 to pass there through. In particular, the first reflective surface 224a and the second reflective surface 224b respectively include one or more clear apertures 240a and 240b (or holes 240a and 240b) formed therein which allows the second delayed path 236 and the third delayed path 238 to pass there through. In this example, the first reflective surface 224a and the second reflective surface 224b respectively include three holes 240a and one hole 240b formed therein which allows the second delayed path 236 and the third delayed path 238 to pass there through. In addition, the third reflective surface 228a and the fourth reflective surface 228b respectively include one or more clear apertures 242a and 242b (or holes 242a and 242b) formed therein which allows the third delayed path 238 to pass there through. In this example, the third reflective surface 228a and the fourth reflective surface 228b respectively include one hole 242a and one hole 242b formed therein which allows the third delayed path 238 to pass there through.

The first beam splitter 210 is disposed between the first reflective surface 224a and the second reflective surface 224b, between the third reflective surface 228a and the fourth reflective surface 228b, and between the fifth reflective surface 230a and the sixth reflective surface 230b. The first compensator plate 212 (e.g., first offset plate 212) is disposed between the first beam splitter 210 and the first reflective surface 224a. The second beam splitter 214 is disposed between the first reflective surface 224a and the second reflective surface 224b and between the third reflective surface 228a and the fourth reflective surface 228b, and between the fifth reflective surface 230a and the sixth reflective surface 230b. The second compensator plate 216 (e.g., second offset plate 216) is disposed between the second beam splitter 214 and the third reflective surface 228a. The third beam splitter 218 is disposed between the first reflective surface 224a and the second reflective surface 224b and between the third reflective surface 228a and the fourth reflective surface 228b, and between the fifth reflective surface 230a and the sixth reflective surface 230b. The third compensator plate 220 (e.g., second offset plate 220) is disposed between the third beam splitter 218 and the fifth reflective surface 230a.

The first beam splitter 210, the second beam splitter 214, and the third beam splitter 218 are each configured to reflect a certain percentage of a light beam and transmit the remaining percentage of the light beam. Preferably, the first beam splitter 210, the second beam splitter 214, and the third beam splitter 218 have a reflectance plus transmittance which equal one. If desired, the first beam splitter 210, the second beam splitter 214, and the third beam splitter 218 can have variable beam splitter coatings or discrete beam splitter coatings. In this case, the reflectivity of the first beam splitter 210, the second beam splitter 214, and the third beam splitter 218 can be changed by controlling which specific coating is in the path of the incident beam. This is one way that can be used to adjust the temporal profile of the output pulse. A more detailed discussion about these types of beam splitters is described in a co-filed U.S. patent application Ser. No. 13/316,884 entitled "Variable Pulse Stretching Length by Variable Beamsplitter Reflectivity". The contents of this document are incorporated by reference herein.

As shown in FIGS. 2A-2D, the first beam splitter 210 is configured to receive an incident light beam 232 and pass a portion of the incident light beam 232a onto an output path 244a and to redirect a remaining portion of the incident light beam 232b through the first compensator plate 212 onto the first delayed path 234 created by the first pair of reflective optical surfaces 204. The first beam splitter 210 is also configured to receive the remaining portion of the incident light beam 232b that traversed the first delayed path 234 and redirect a portion of the incident light beam 232c that traversed the first delayed path 234 onto the output path 244a and pass a remaining portion of the incident light beam 232d that traversed the first delayed path 234 back onto the first delayed path 234. Basically, a remaining portion of the incident light beam 232 will traverse the first delayed path 234 multiple times where each time less energy from the incident light beam 232 is redirected to the output path 244a and passed back onto the first delayed path 234.

Figure 2C:
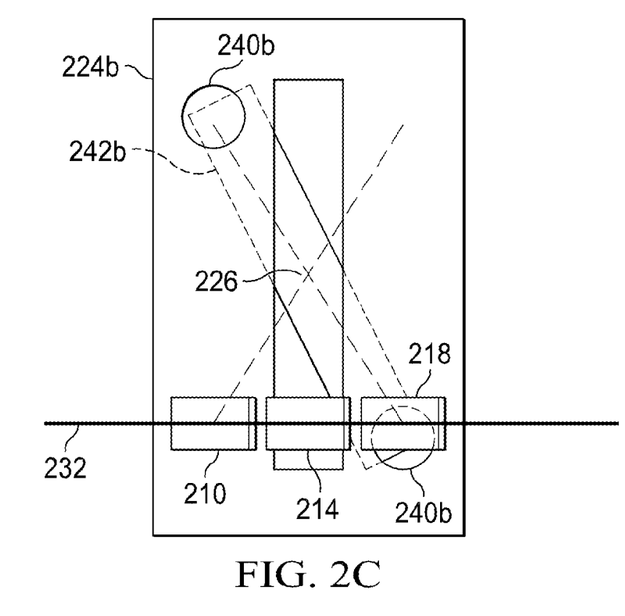
Figure 2D:
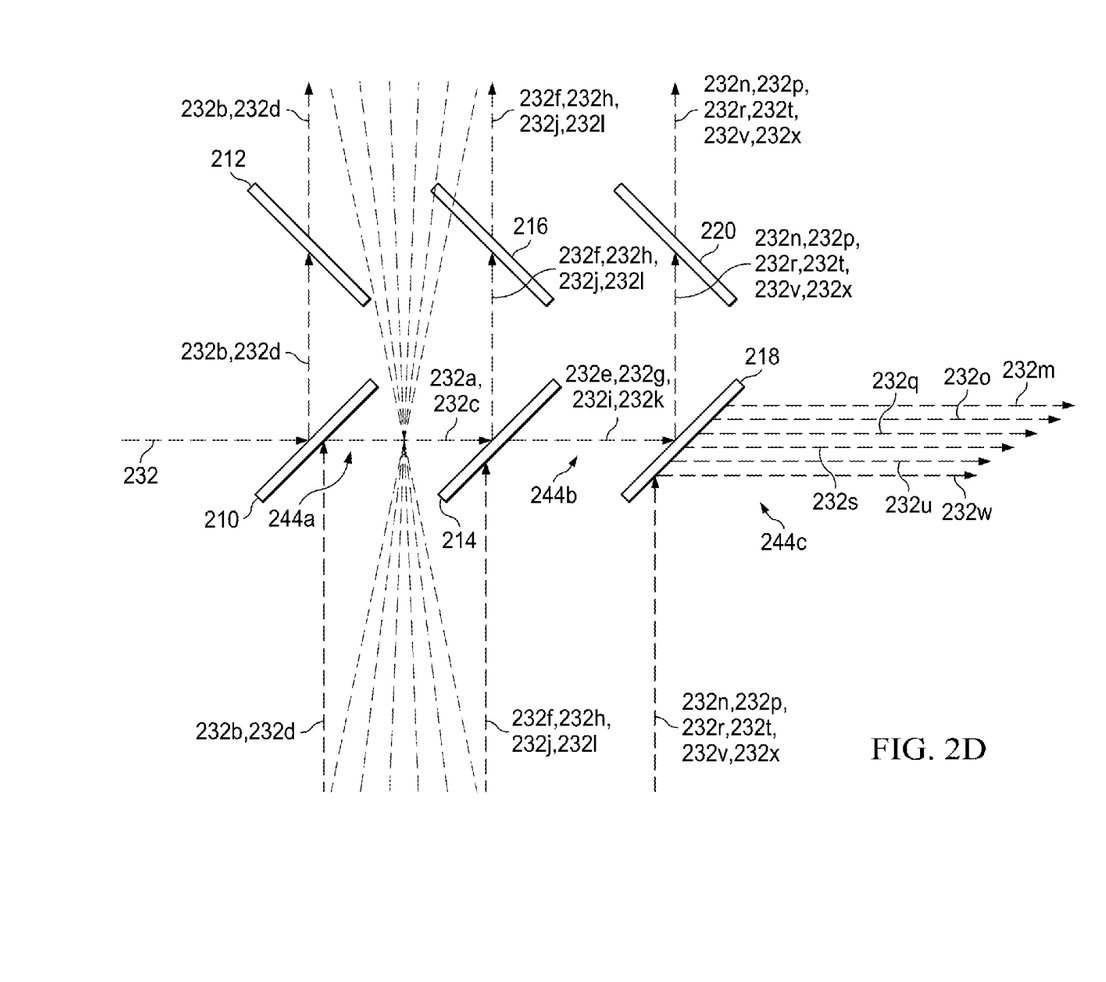

The first delayed path 234 starts from the first beam splitter 210 where the remaining portion of the incident light beam 232b travels through the first compensator plate 212 to the first reflective surface 224a (see label "1"). The first reflective surface 224a reflects the remaining portion of the incident light beam 232b through the common focus 226 to the second reflective surface 224b (see label "2"). The second reflective surface 224b reflects the remaining portion of the incident light beam 232b to the first reflective surface 224a (see label "3"). The first reflective surface 224a reflects the remaining portion of the incident light beam 232b through the common focus 226 to the second reflective surface 224b (see label "4"). The second reflective surface 224b reflects the remaining portion of the incident light beam 232b back to the first beam splitter 210 (see label "5").

The second beam splitter 214 is configured to receive the portion of the incident light beam 232a that traversed the output path 244a but not the first delayed path 234 and pass a portion of the incident light beam 232e that traversed the output path 244a and not the first delayed path 234 onto the output path 244b and to redirect a remaining portion of the incident light beam 232f that had traversed the output path 244a and not the first delayed path 234 through the second compensator plate 216 onto the second delayed path 236. The second beam splitter 214 is also configured to receive the remaining portion of the incident light beam 232f that traversed the second delayed path 236 and redirect a portion of the incident light beam 232g that traversed the second delayed path 236 onto the output path 244b and pass a remaining portion of the incident light beam 232h that traversed the second delayed 236 path back onto the second delayed path 236.

Furthermore, the second beam splitter 214 is configured to receive the portion of the incident light beam 232c that traversed the output path 244a and the first delayed path 234. The second beam splitter 214 is also configured to pass a portion of the incident light beam 232i that traversed the output path 244a and the first delayed path 234 onto the output path 244b and to redirect a remaining portion of the incident light beam 232j that had traversed the output path 244a and the first delayed path 234 onto the second delayed path 236. In addition, the second beam splitter 214 is configured to receive the remaining portion of the incident light beam 232j that traversed the second delayed path 236 and redirect a portion of the incident light beam 232k that traversed the second delayed path 236 onto the output path 244b and pass a remaining portion of the incident light beam 232*l* that traversed the second delayed path 236 back onto the second delayed path 236. Basically, a remaining portion of the incident light beam 232 will traverse the second delayed path 236 multiple times where each time less energy from the incident light beam 232 is redirected to the output path 244*b* and passed back onto the second delayed path 236.

The second delayed path 236 starts from the second beam splitter 214 where the remaining portion of the incident light beam 232*f* (for example) travels through the second compensator plate 216 and the hole 240*a* in the first reflective surface 224*a* to the third reflective surface 228*a* (see label "a"). The third reflective surface 228*a* reflects the remaining portion of the incident light beam 232*f* through the hole 240*a* in the first reflective surface 224*a*, the common focus 226 and hole 240*b* in the second reflective surface 224*b* to the fourth reflective surface 228*b* (see label "b"). The fourth reflective surface 228*b* reflects the remaining portion of the incident light beam 232*f* through the hole 240*b* in the second reflective surface 224*b* and the hole 240*a* in the first reflective surface 224*a* to the third reflective surface 228*a* (see label "c"). The third reflective surface 228*a* reflects the remaining portion of the incident light beam 232*f* through the hole 240*a* in the first reflective surface 224*a*, the common focus 226 and the hole 240*b* in the second reflective surface 224*b* to the fourth reflective surface 228*b* (see label "d"). The fourth reflective surface 228*b* reflects the remaining portion of the incident light beam 232*f* through the hole 240*b* in the second reflective surface 224*b* back to the second beam splitter 214 (see label "e"). As can be seen, the second delayed path 236 is longer than the first delayed path 234.

The third beam splitter 218 is configured to receive the portion of the incident light beam 232*e* that traversed the output paths 244*a* and 244*b* but not the first and second delayed paths 234 and 236 and pass a portion of the incident light beam 232*m* that traversed the output paths 244*a* and 244*b* but not the first and second delayed paths 234 and 236 onto the output path 244*c* and to redirect a remaining portion of the incident light beam 232*n* that had traversed the output paths 244*a* and 244*b* but not the first and second delayed paths 234 and 236 through the third compensator plate 220 onto the third delayed path 238. The third beam splitter 218 is also configured to receive the remaining portion of the incident light beam 232*n* that traversed the third delayed path 238 and redirect a portion of the incident light beam 232*o* that traversed the third delayed path 238 onto the output path 244*c* and pass a remaining portion of the incident light beam 232*p* that traversed the third delayed 238 path back onto the third delayed path 238.

Moreover, the third beam splitter 218 is configured to receive the portion of the incident light beam 232*i* that traversed the output paths 244*a* and 244*b* and the first delayed path 234 but not the second delayed path 236. The third beam splitter 218 is also configured to pass a portion of the incident light beam 232*q* that traversed the output paths 244*a* and 244*b* and the first delayed path 232 but not the second delayed path 234 onto the output path 244*c* and to redirect a remaining portion of the incident light beam 232*r* that had traversed the output paths 244*a* and 244*b* and the first delayed path 234 but not the second delayed path 236 onto the third delayed path 238. In addition, the third beam splitter 218 is configured to receive the remaining portion of the incident light beam 232*r* that traversed the third delayed path 238 and redirect a portion of the incident light beam 232*s* that traversed the third delayed path 238 onto the output path 244*c* and pass a remaining portion of the incident light beam 232*t* that traversed the third delayed path 238 back onto the third delayed path 238.

Furthermore, the third beam splitter 218 is configured to receive the portion of the incident light beam 232*j* that traversed the output paths 244*a* and 244*b* and the first and second delayed paths 234 and 236. The third beam splitter 218 is also configured to pass a portion of the incident light beam 232*u* that traversed the output paths 244*a* and 244*b* and the first and second delayed paths 232 and 234 onto the output path 244*c* and to redirect a remaining portion of the incident light beam 232*v* that had traversed the output paths 244*a* and 244*b* and the first and second delayed paths 234 and 236 onto the third delayed path 238. In addition, the third beam splitter 218 is configured to receive the remaining portion of the incident light beam 232*v* that traversed the third delayed path 238 and redirect a portion of the incident light beam 232*w* that traversed the third delayed path 238 onto the output path 244*c* and pass a remaining portion of the incident light beam 232*x* that traversed the third delayed path 238 back onto the third delayed path 238. Basically, a remaining portion of the incident light beam 232 will traverse the third delayed path 238 multiple times where each time less energy from the incident light beam 232 is redirected to the output path 244*c* and passed back onto the third delayed path 238.

The third delayed path 238 starts from the third beam splitter 218 where the remaining portion of the incident light beam 232*n* (for example) travels through the third compensator plate 220 and the holes 240*a* and 242*a* in the first and third reflective surfaces 224*a* and 228*a* to the fifth reflective surface 230*a* (see label "A"). The fifth reflective surface 230*a* reflects the remaining portion of the incident light beam 232*n* through the holes 240*a* and 242*a* in the first and third reflective surfaces 224*a* and 228*a*, the common focus 226 and holes 240*b* and 242*b* in the second and fourth reflective surfaces 224*b* and 228*b* to the sixth reflective surface 220*b* (see label "B"). The sixth reflective surface 230*b* reflects the remaining portion of the incident light beam 232*n* through the holes 240*b* and 242*b* in the second and fourth reflective surfaces 224*b* and 228*b* and the holes 240*a* and 240*b* in the first and third reflective surfaces 224*a* and 228*a* to the fifth reflective surface 230*a* (see label "C"). The fifth reflective surface 230*a* reflects the remaining portion of the incident light beam 232*n* through the holes 240*a* and 242*a* in the first and third reflective surfaces 224*a* and 228*a*, the common focus 226 and the holes 240*b* and 242*b* in the second and fourth reflective surfaces 224*b* and 228*b* to the sixth reflective surface 230*b* (see label "D"). The sixth reflective surface 230*b* reflects the remaining portion of the incident light beam 232*n* through the holes 240*b* and 242*b* in the second and fourth reflective surfaces 224*b* and 228*b* back to the third beam splitter 218 (see label "E"). As can be seen, the third delayed path 238 is longer than the second delayed path 236 which is longer than the first delayed path 234. FIG. 2C is a top view diagram illustrating the first, second and third beam splitters 210, 214 and 218 positioned over the second reflective surface 224*b* including hole 240*b*.

The beam splitter selector unit 222 can be used so the user can activate and deactivate anyone or combination of the first beam splitter 210, the second beam splitter 214 and the third beam splitter 218 to select which delayed paths 236, 234 and/or 238 is/are traversed or which combinations of delayed paths 234, 236 and 238 are traversed to tailor the output pulse' temporal profile. For instance, the beam splitter selector unit 222 can be used to activate the first beam splitter 210 and deactivate the second and third beam splitters 214 and 218 such that only the first delayed path 234 is traversed. Or, the beam splitter selector unit 222 can be used to deactivate the first beam splitter 210 and activate the second and third beam splitters 214 and 218 such that only the second and third delayed paths 236 and 238 are traversed. Alternatively, the beam splitter selector unit 222 can be used to activate the first and third beam splitters 210 and 218 and deactivate the second beam splitter 214 such that only the first and third delayed paths 234 and 236 are traversed. Furthermore, the beam splitter selector unit 222 can be used to activate the first, second and third beam splitters 210, 214 and 218 such that the first, second and third delayed paths 234, 236 and 238 are traversed.

Figure 3A:
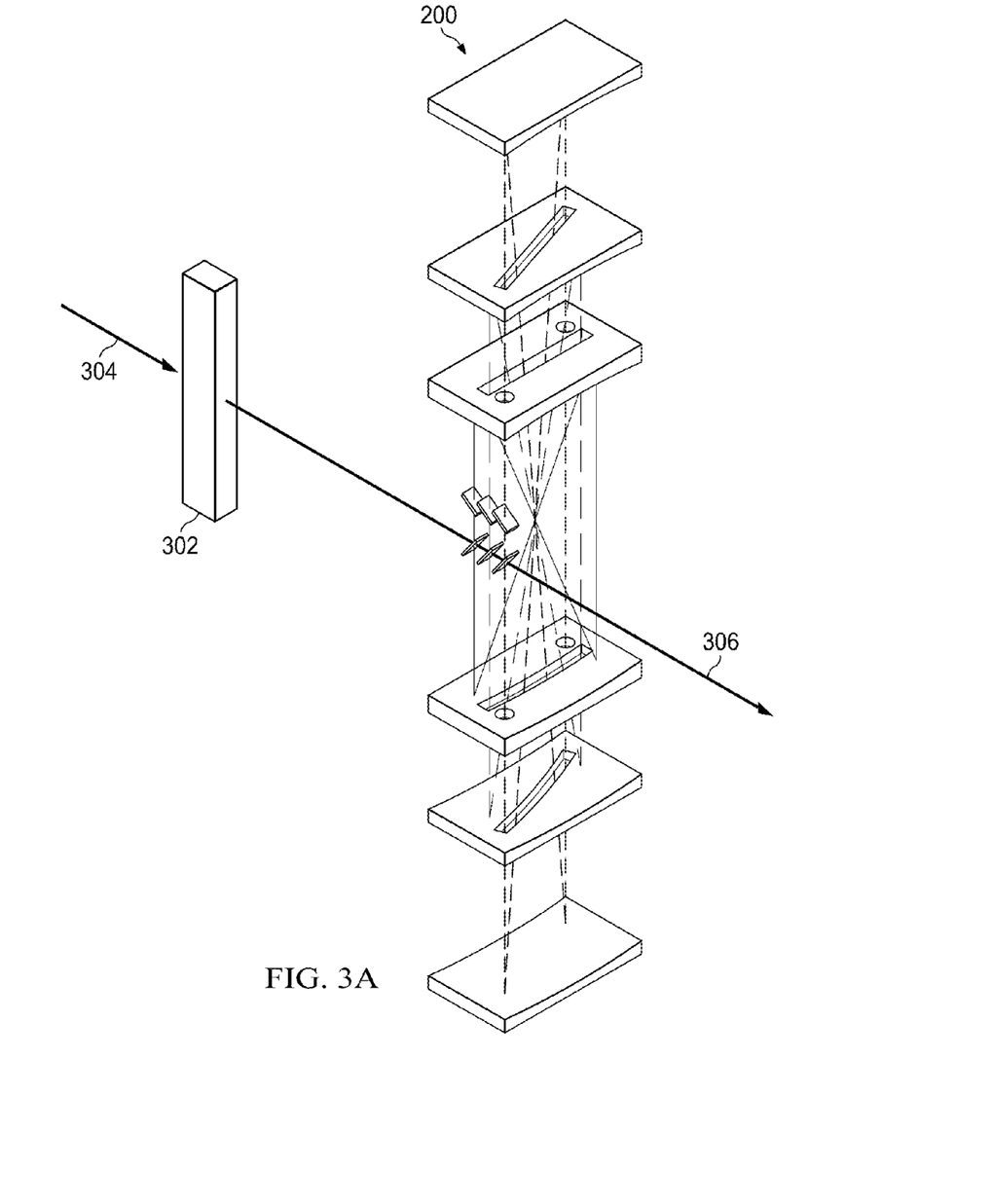
FIGS. 3A-3C are several diagrams illustrating an exemplary application where an optional laser pulse stretching unit is used in combination with the laser pulse stretching unit shown in FIGS. 2A-2D in accordance with another embodiment of the present invention.
Figure 3B:
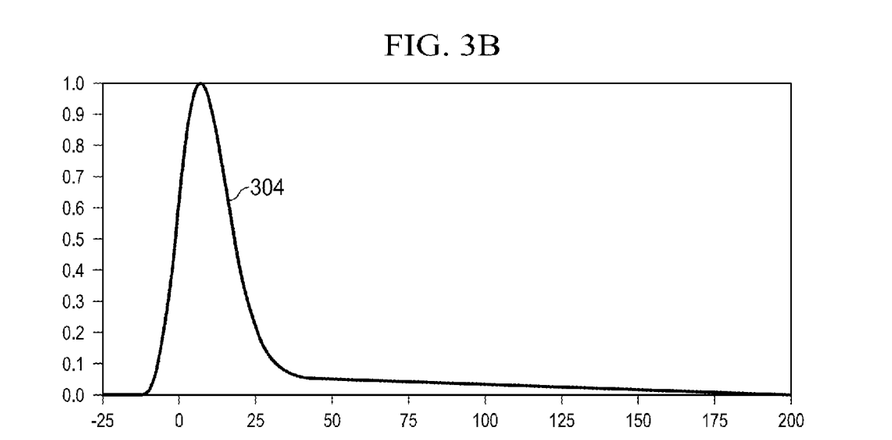
Figure 3C:
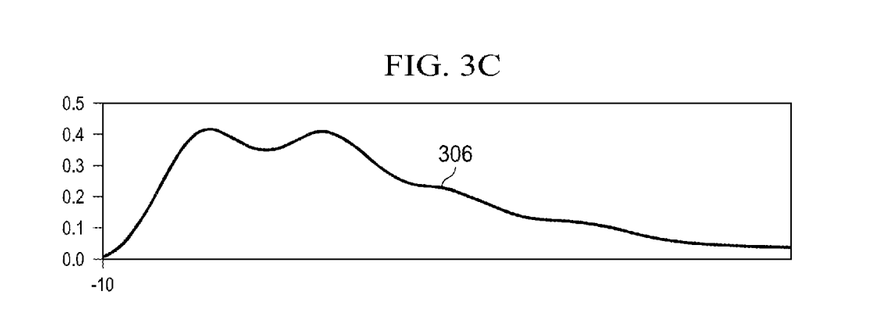

Referring to FIGS. 3A-3C, there are several diagrams illustrating an exemplary configuration where an optional laser pulse stretching unit 302 is used in along with the exemplary laser pulse stretching unit 200 in accordance with an embodiment of the present invention. The optional laser pulse stretching unit 302 which has one delayed path is added externally in series to the laser pulse stretching unit 200. This exemplary configuration can be used to receive an input laser pulse 304 (see FIG. 3B where the x axis is time and the y-axis is relative intensity) an output a stretched laser pulse 306 (see FIG. 3C) which has a desirable uniformity (smoothness) of the beam intensity. In this example, the input laser pulse 304 has a 20 ns FWHM (Full Width at Hall Maximum) while a broad range of stretched laser pulses 306 can be output which have a FWHM greater than the input pulse. The specific stretched laser pulse 306 which is output can be selected by turning on or off the delayed path (channel #1) of the optional laser pulse stretching unit 302 and the delayed paths 234 (channel #2), 236 (channel #3) and 238 (channel #4) of the laser pulse stretching unit 200 by changing out (deactivating) the beam splitter in the optional laser pulse stretching unit 302 and the beam splitters 210, 214, and 218 in the laser pulse stretching unit 200. TABLE 1 illustrates the various stretched laser pulses 306 that can be achieved in this particular application.

TABLE 1

| Optional unit 302 | Laser pulse stretching unit 200 | | | | Laser pulse 306 |
| --- | --- | --- | --- | --- | --- |
| Channel #1 | Channel #2 | Channel #3 | Channel #4 | Smoothness | FWHM (ns) |
| — | ON | ON | — | 0.0 | 38 |
| — | ON | — | ON | 0.5 | 64 |
| — | — | ON | ON | 0.0 | 65 |
| — | ON | ON | ON | 0.0 | 72 |
| ON | ON | — | ON | 0.2 | 90 |
| ON | — | ON | ON | 0.3 | 93 |
| ON | ON | ON | ON | 0.0 | 98 |

Note:
This is an exemplary application and there are numerous ways one could use one or more of the new laser stretching pulse units by themselves or in combination with one or more traditional laser stretching pulse units to control the stretching of an input laser pulse beam.

From the foregoing, two exemplary laser pulse stretching units 100 and 200 have been described herein which respectively have two nested delayed paths 124 and 126 and three nested delayed paths 234, 236 and 238. However, a person skilled in the art based on the teachings herein will readily appreciate that the present invention includes a laser pulse stretching unit which has four nested optical delayed paths where a fourth beam splitter, a fourth optical compensator, and an additional outer pair of reflective optical surfaces would be added to the laser pulse stretching unit 200. In this particular case, the reflective surfaces 230a and 230b would also have one or more clear apertures (or holes) formed therein to allow a fourth delayed path to pass there through. In fact, the person skilled in the art will readily appreciate that the present invention includes laser pulse stretching units that have five or more nested delayed paths by adding additional beam splitters, optical compensators, and pairs of reflective optical surfaces. Furthermore, the laser pulse stretching units with multiple nested delayed paths may need to incorporate inner reflective optical surfaces with increasingly larger diameters to accommodate the extra delayed paths.

As described above, the new laser pulse stretching unit can have some number of delayed paths (delayed lines) which take a single input beam and can create multiple temporally delayed beams. The beam from each delay path is combined to form a single output beam which is the summation of each delay line. Multiple delay paths are placed serially with respect to one another to lengthen or "stretch" the beam pulse length in time while maintaining uniformity of the beam intensity. The uniformity of the beam over time is described as smoothness in the beam where it is desirable to have very little or no structure or undulations in the stretched pulse shape. The laser pulse stretching unit, by using multiple delay lines of different path lengths in series, enable the single pulse beam to be stretched to produce a pulse without significant structure. The laser pulse stretching unit can have one or more of the following features:

1. Delay lines of different path lengths placed in series may be done in a manner where pairs of reflective optical surfaces are nested inside another pairs of optical surfaces.
2. The reflective inner optical surfaces will have either clear apertures or holes in their surfaces which will not block the paths of other delay lines.
3. The reflective optical surfaces may be separated segments or a continuous reflective surface to allow a reduced package size and ease of fabrication of the reflective surfaces.
4. The reflective optical surfaces can be spheres, parabolas, aspheres, conics, planar, or combinations of curved surfaces and flats. Such reflective optical surfaces are arranged to form an optical delayed path with a method to recombine each delayed beam into a single beam. The reflective optical surfaces are also arranged such that each optical delayed path will return the beam back to the corresponding beam splitter.
5. The reflective optical surfaces could have features which will help with alignment, such as machined flats or light leakages.
6. The reflective optical surfaces could also have non circular and/or non continuous apertures.
7. One mechanical package can be used to house the components which form the nested optical delayed paths. This mechanical package would have a smaller mechanical footprint when compared to the mechanical footprint of other mechanical packages needed to house components of different serially placed optical delayed paths.
8. The new laser pulse stretching unit by stretching or lengthening the temporal pulse width of a laser beam has many applications in the area of laser energy management. One benefit of increasing the pulse length while decreasing the peak power of a pulsed laser without losses to the average power is that this effectively reduces the laser induced material damage on optical components. The application of temporal laser pulse stretching described herein is well suited for use in material processing to form the crystallization of amorphous silicon.
9. The new laser pulse stretching unit may include a beam splitter selector unit which is used to select which delayed path(s) is/are traversed or which combinations of delayed paths are traversed to tailor the output pulse length. The beam splitters could be either temporal or spatial beam splitters.

10. The new laser pulse stretching unit uses beam splitters to separate a beam pulse where the separate beam pulses are recombined later to create a different shaped pulse which is possible if one delayed path length is different from the other. Plus, by doing this multiple times and with multiple delay lengths, significant control of the beam pulse profile can be accomplished.

Finally, the new laser pulse stretching unit has a configuration which allows for the design to be more compact. The multiple beam splitters keep the delayed paths in series, while the reflective optical surfaces that form the delayed paths are nested within one another. The result is that a single mechanical package can be used to contain some number of delayed paths. Basically, the new laser pulse stretching unit effectively combines multiple pulse delay modules into one module.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims.

The invention claimed is:

1. A laser light pulse stretching unit comprising:
   a first pair of reflective optical surfaces including a first reflective surface and a second reflective surface that share a common focus;
   a second pair of reflective optical surfaces including a third reflective surface and a fourth reflective surface that share the common focus;
   the first pair of reflective optical surfaces are nested within the second pair of reflective optical surfaces whereby the first reflective surface and the second reflective surface are disposed between the third reflective surface and the fourth reflective surface;
   the first pair of reflective optical surfaces create a first delayed path;
   the second pair of reflective optical surfaces create a second delayed path wherein the first pair of reflective optical surfaces are configured to allow the second delayed path to pass there through;
   a first beam splitter disposed between the first reflective surface and the second reflective surface and between the third reflective surface and the fourth reflective surface; and
   a second beam splitter disposed between the first reflective surface and the second reflective surface and between the third reflective surface and the fourth reflective surface.

2. The laser light pulse stretching unit of claim 1, wherein the first beam splitter is configured to receive an incident light beam and pass a portion of the incident light beam onto an output path and to redirect a remaining portion of the incident light beam onto the first delayed path created by the first pair of reflective optical surfaces and then receive the remaining portion of the incident light beam that traversed the first delayed path and redirect a portion of the incident light beam that traversed the first delayed path onto the output path and pass a remaining portion of the incident light beam that traversed the first delayed path back onto the first delayed path.

3. The laser light pulse stretching unit of claim 2, wherein the first delayed path starts from the first beam splitter where the remaining portion of the incident light beam travels to the first reflective surface which reflects the remaining portion of the incident light beam through the common focus to the second reflective surface which reflects the remaining portion of the incident light beam to the first reflective surface which reflects the remaining portion of the incident light beam through the common focus to the second reflective surface which reflects the remaining portion of the incident light beam back to the first beam splitter.

4. The laser light pulse stretching unit of claim 2, wherein:
   the second beam splitter is configured to receive the portion of the incident light beam that traversed the output path but not the first delayed path and pass a portion of the incident light beam that traversed the output path and not the first delayed path onto the output path and to redirect a remaining portion of the incident light beam that had traversed the output path and not the first delayed path onto the second delayed path and then receive the remaining portion of the incident light beam that traversed the second delayed path and redirect a portion of the incident light beam that traversed the second delayed path onto the output path and pass a remaining portion of the incident light beam that traversed the second delayed path back onto the second delayed path; and
   the second beam splitter configured to receive the portion of the incident light beam that traversed the output path and the first delayed path and pass a portion of the incident light beam that traversed the output path and the first delayed path onto the output path and to redirect a remaining portion of the incident light beam that had traversed the output path and the first delayed path onto the second delayed path and then receive the remaining portion of the incident light beam that traversed the second delayed path and redirect a portion of the incident light beam that traversed the second delayed path onto the output path and pass a remaining portion of the incident light beam that traversed the second delayed path back onto the second delayed path.

5. The laser light pulse stretching unit of claim 4, wherein the second delayed path starts from the second beam splitter where the remaining portion of the incident light beam directed thereon travels through the first reflective surface to the third reflective surface which reflects the remaining portion of the incident light beam through the first reflective surface, the common focus and the second reflective surface to the fourth reflective surface which reflects the remaining portion of the incident light beam through the second reflective surface and the first reflective surface to the third reflective surface which reflects the remaining portion of the incident light beam through the first reflective surface, the common focus and the second reflective surface to the fourth reflective surface which reflects the remaining portion of the incident light beam through the second reflective surface back to the second beam splitter.

6. The laser light pulse stretching unit of claim 1, wherein the first delayed path and the second delayed path are in series to one another.

7. The laser light pulse stretching unit of claim 1, further comprising a mechanical package that houses the first pair of reflective optical surfaces, the second pair of reflective optical surfaces, the first beam splitter, and the second beam splitter.

8. The laser light pulse stretching unit of claim 1, further comprising:
   a first compensator plate disposed between the first beam splitter and the first reflective surface; and
   a second compensator plate disposed between the second beam splitter and the third reflective surface.

9. The laser light pulse stretching unit of claim 1, wherein:
the first reflective surface includes at least one clear aperture or hole therein which allow the second delayed path to pass there through; and
the second reflective surface includes at least one clear aperture or hole therein which allow the second delayed path to pass there through.

10. The laser light pulse stretching unit of claim 1, wherein:
the first reflective surface includes separated segments or a single reflective surface;
the second reflective surface includes separated segments or a single reflective surface;
the third reflective surface includes separated segments or a single reflective surface; and
the fourth reflective surface includes separated segments or a single reflective surface.

11. The laser light pulse stretching unit of claim 1, further comprising a beam splitter selector configured to change out anyone or both of the first beam splitter and the second beam splitter.

12. The laser light pulse stretching unit of claim 1, wherein at least one of the first beam splitter and the second beam splitter has variable beam splitter coatings or discrete beam splitter coatings which control a reflectivity of the first beam splitter and the second beam splitter.

13. The laser light pulse stretching unit of claim 1, further comprising;
a third pair of reflective optical surfaces including a fifth reflective surface and a sixth reflective surface that share the common focus;
the first pair of reflective optical surfaces are nested within the second pair of reflective optical surfaces and the second pair of reflective optical surfaces are nested within the third pair of reflective optical surfaces whereby the first reflective surface and the second reflective surface are disposed between the third reflective surface and the fourth reflective surface and the third reflective surface and the fourth reflective surface are disposed between the fifth reflective surface and the sixth reflective surface;
the third pair of reflective optical surfaces create a third delayed path wherein the first pair of reflective optical surfaces and the second pair of reflective optical surfaces are configured to allow the third delayed path to pass there through;
the first pair of reflective optical surfaces are also configured to allow the third delayed path to pass there through; and
a third beam splitter disposed between the first reflective surface and the second reflective surface, between the third reflective surface and the fourth reflective surface, and between the fifth reflective surface and the sixth reflective surface.

14. The laser light pulse stretching unit of claim 13, wherein the first beam splitter is configured to receive an incident light beam and pass a portion of the incident light beam onto an output path and to redirect a remaining portion of the incident light beam onto the first delayed path created by the first pair of reflective optical surfaces and then receive the remaining portion of the incident light beam that traversed the first delayed path and redirect a portion of the incident light beam that traversed the first delayed path onto the output path and pass a remaining portion of the incident light beam that traversed the first delayed path back onto the first delayed path.

15. The laser light pulse stretching unit of claim 14, wherein the first delayed path starts from the first beam splitter where the remaining portion of the incident light beam travels to the first reflective surface which reflects the remaining portion of the incident light beam through the common focus to the second reflective surface which reflects the remaining portion of the incident light beam to the first reflective surface which reflects the remaining portion of the incident light beam through the common focus to the second reflective surface which reflects the remaining portion of the incident light beam back to the first beam splitter.

16. The laser light pulse stretching unit of claim 14, wherein:
the second beam splitter is configured to receive the portion of the incident light beam that traversed the output path but not the first delayed path and pass a portion of the incident light beam that traversed the output path and not the first delayed path onto the output path and to redirect a remaining portion of the incident light beam that had traversed the output path and not the first delayed path onto the second delayed path and then receive the remaining portion of the incident light beam that traversed the second delayed path and redirect a portion of the incident light beam that traversed the second delayed path onto the output path and pass a remaining portion of the incident light beam that traversed the second delayed path back onto the second delayed path; and
the second beam splitter configured to receive the portion of the incident light beam that traversed the output path and the first delayed path and pass a portion of the incident light beam that traversed the output path and the first delayed path on the output path and to redirect a remaining portion of the incident light beam that had traversed the output path and the first delayed path onto the second delayed path and then receive the remaining portion of the incident light beam that traversed the second delayed path and redirect a portion of the incident light beam that traversed the second delayed path onto the output path and pass a remaining portion of the incident light beam that traversed the second delayed path back onto the second delayed path.

17. The laser light pulse stretching unit of claim 16, wherein the second delayed path starts from the second beam splitter where the remaining portion of the incident light beam directed thereon travels through the first reflective surface to the third reflective surface which reflects the remaining portion of the incident light beam through the first reflective surface, the common focus and the second reflective surface to the fourth reflective surface which reflects the remaining portion of the incident light beam through the second reflective surface and the first reflective surface to the third reflective surface which reflects the remaining portion of the incident light beam through the first reflective surface, the common focus and the second reflective surface to the fourth reflective surface which reflects the remaining portion of the incident light beam through the second reflective surface back to the second beam splitter.

18. The laser light pulse stretching unit of claim 16, wherein:
the third beam splitter is configured to receive the portion of the incident light beam that traversed the output path but not the first delayed path and the second delayed path and pass a portion of the incident light beam that traversed the output path and not the first delayed path and the second delayed path onto the output path and to redirect a remaining portion of the incident light beam that had traversed the output path and not the first delayed path and the second delayed path onto the third delayed path and then receive the remaining portion of the incident light beam that traversed the third delayed path and redirect a portion of the incident light beam that traversed the third delayed path onto the output path and pass a remaining portion of the incident light beam that traversed the third delayed path back onto the third delayed path;

the third beam splitter configured to receive the portion of the incident light beam that traversed the output path and the first delayed path but not the second delayed path and pass a portion of the incident light beam that traversed the output path and the first delayed path but not the second delayed path onto the output path and to redirect a remaining portion of the incident light beam that had traversed the output path and the first delayed path but not the second delayed path onto the third delayed path and then receive the remaining portion of the incident light beam that traversed the third delayed path and redirect a portion of the incident light beam that traversed the third delayed path onto the output path and pass a remaining portion of the incident light beam that traversed the third delayed path back onto the third delayed path; and the third beam splitter configured to receive the portion of the incident light beam that traversed the output path, the first delayed path and the second delayed path and pass a portion of the incident light beam that traversed the output path, the first delayed path and the second delayed path onto the output path and to redirect a remaining portion of the incident light beam that had traversed the output path, the first delayed path and the second delayed path onto the third delayed path and then receive the remaining portion of the incident light beam that traversed the third delayed path and redirect a portion of the incident light beam that traversed the third delayed path onto the output path and pass a remaining portion of the incident light beam that traversed the third delayed path back onto the third delayed path.

19. The laser light pulse stretching unit of claim 18, wherein the third delayed path starts from the third beam splitter where the remaining portion of the incident light beam directed thereon travels through the first reflective surface and the third reflective surface to the fifth reflective surface which reflects the remaining portion of the incident light beam through the third reflective surface, the first reflective surface, the common focus, the second reflective surface and the fourth reflective surface to the sixth reflective surface which reflects the remaining portion of the incident light beam through the fourth reflective surface, the second reflective surface, the first reflective surface and the third reflective surface to the fifth reflective surface which reflects the remaining portion of the incident light beam through the third reflective surface, the first reflective surface, the common focus, the second reflective surface and the fourth reflective surface to the sixth reflective surface which reflects the remaining portion of the incident light beam through the fourth reflective surface and the second reflective surface back to the third beam splitter.

20. The laser light pulse stretching unit of claim 13, further comprising a mechanical package that houses the first pair of reflective optical surfaces, the second pair of reflective optical surfaces, the third pair of reflective optical surface, the first beam splitter, the second beam splitter and the third beam splitter.

21. The laser light pulse stretching unit of claim 13, further comprising:
a first compensator plate disposed between the first beam splitter and the first reflective surface;
a second compensator plate disposed between the second beam splitter and the third reflective surface; and
a third compensator plate disposed between the third beam splitter and the fifth reflective surface.

22. The laser light pulse stretching unit of claim 13, wherein:
the first reflective surface includes at least one clear aperture or hole therein which allow the second delayed path to pass there through;
the second reflective surface includes at least one clear aperture or hole therein which allow the second delayed path to pass there through;
the third reflective surface includes at least one clear aperture or hole therein which allow the third delayed path to pass there through; and
the fourth reflective surface includes at least one clear aperture or hole therein which allow the third delayed path to pass there through.

23. The laser light pulse stretching unit of claim 13, wherein:
the first reflective surface includes separated segments or a single reflective surface;
the second reflective surface includes separated segments or a single reflective surface;
the third reflective surface includes separated segments or a single reflective surface;
the fourth reflective surface includes separated segments or a single reflective surface;
the fifth reflective surface includes separated segments or a single reflective surface; and
the sixth reflective surface includes separated segments or a single reflective surface.

24. The laser light pulse stretching unit of claim 13, further comprising a beam splitter selector configured to change out anyone or combination of the first beam splitter, the second beam splitter, and the third beam splitter.

25. The laser light pulse stretching unit of claim 13, wherein at least one of the first beam splitter, the second beam splitter, and the third beam splitter has variable beam splitter coatings or discrete beam splitter coatings which control a reflectivity of the first beam splitter, the second beam splitter and the third beam splitter.

26. A method for using a light pulse stretching unit comprising the step of:
receiving an incident light beam at the laser light pulse stretching unit which comprises:
a first pair of reflective optical surfaces including a first reflective surface and a second reflective surface that share a common focus;
a second pair of reflective optical surfaces including a third reflective surface and a fourth reflective surface that share the common focus;
the first pair of reflective optical surfaces are nested within the second pair of reflective optical surfaces whereby the first reflective surface and the second reflective surface are disposed between the third reflective surface and the fourth reflective surface;
a first beam splitter disposed between the first reflective surface and the second reflective surface and between the third reflective surface and the fourth reflective surface;
the first beam splitter configured to receive the incident light beam and pass a portion of the incident light beam along an output path and to redirect a remaining portion of the incident light beam onto a first delayed path created by the first pair of reflective optical surfaces and then receive the remaining portion of the incident light beam that traversed the first delayed path and redirect a portion of the incident light beam that traversed the first delayed path onto the output path and pass a remaining portion of the incident light beam that traversed the first delayed path back onto the first delayed path;

a second beam splitter disposed between the first reflective surface and the second reflective surface and between the third reflective surface and the fourth reflective surface;

the second beam splitter configured to receive the portion of the incident light beam that traversed the output path but not the first delayed path and pass a portion of the incident light beam that traversed the output path and not the first delayed path onto the output path and to redirect a remaining portion of the incident light beam that had traversed the output path and not the first delayed path onto a second delayed path created by the second pair of reflective optical surfaces where the first reflective surface and the second reflective surface are configured not to block the second delayed path and then redirect a portion of the incident light beam that traversed the second delayed path onto the output path and pass a remaining portion of the incident light beam that traversed the second delayed path back onto the second delayed path; and the second beam splitter configured to receive the portion of the incident light beam that traversed the output path and the first delayed path and pass a portion of the incident light beam that traversed the output path and the first delayed path onto the output path and to redirect a remaining portion of the incident light beam that had traversed the output path and the first delayed path onto the second delayed path and then redirect a portion of the incident light beam that traversed the second delayed path onto the output path and pass a remaining portion of the incident light beam that traversed the second delayed path back onto the second delayed path.

27. The method of claim 26, further comprising a step of changing out anyone or both of the first beam splitter and the second beam splitter to control if only the first delayed path is used or if only the second delayed path is used.

28. The laser light pulse stretching unit of claim 1, wherein the first delayed path includes reflections from the first beam splitter, the first reflective surface and the second reflective surface.

29. The laser light pulse stretching unit of claim 28, wherein the second delayed path includes reflections from the second beam splitter, the third reflective surface and the fourth reflective surface.

* * * * *